No. 785,487. PATENTED MAR. 21, 1905.
E. L. HANEY.
REGULATOR FOR ALTERNATING CURRENTS.
APPLICATION FILED SEPT. 3, 1904.
6 SHEETS—SHEET 2.
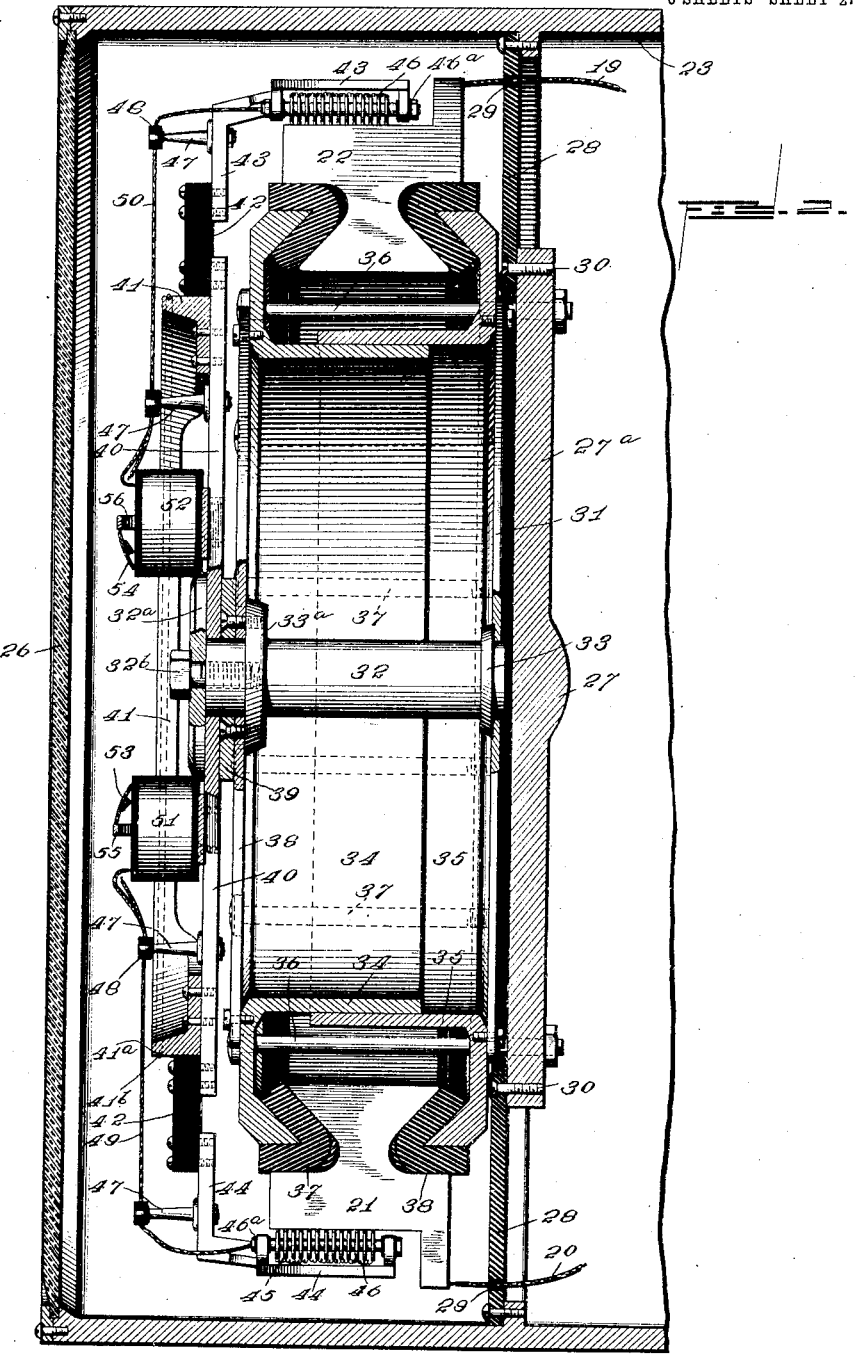
WITNESSES:
INVENTOR
Edward L. Haney
BY
ATTORNEYS No. 785,487. PATENTED MAR. 21, 1905.
E. L. HANEY.
REGULATOR FOR ALTERNATING CURRENTS.
APPLICATION FILED SEPT. 3, 1904.
6 SHEETS—SHEET 3.
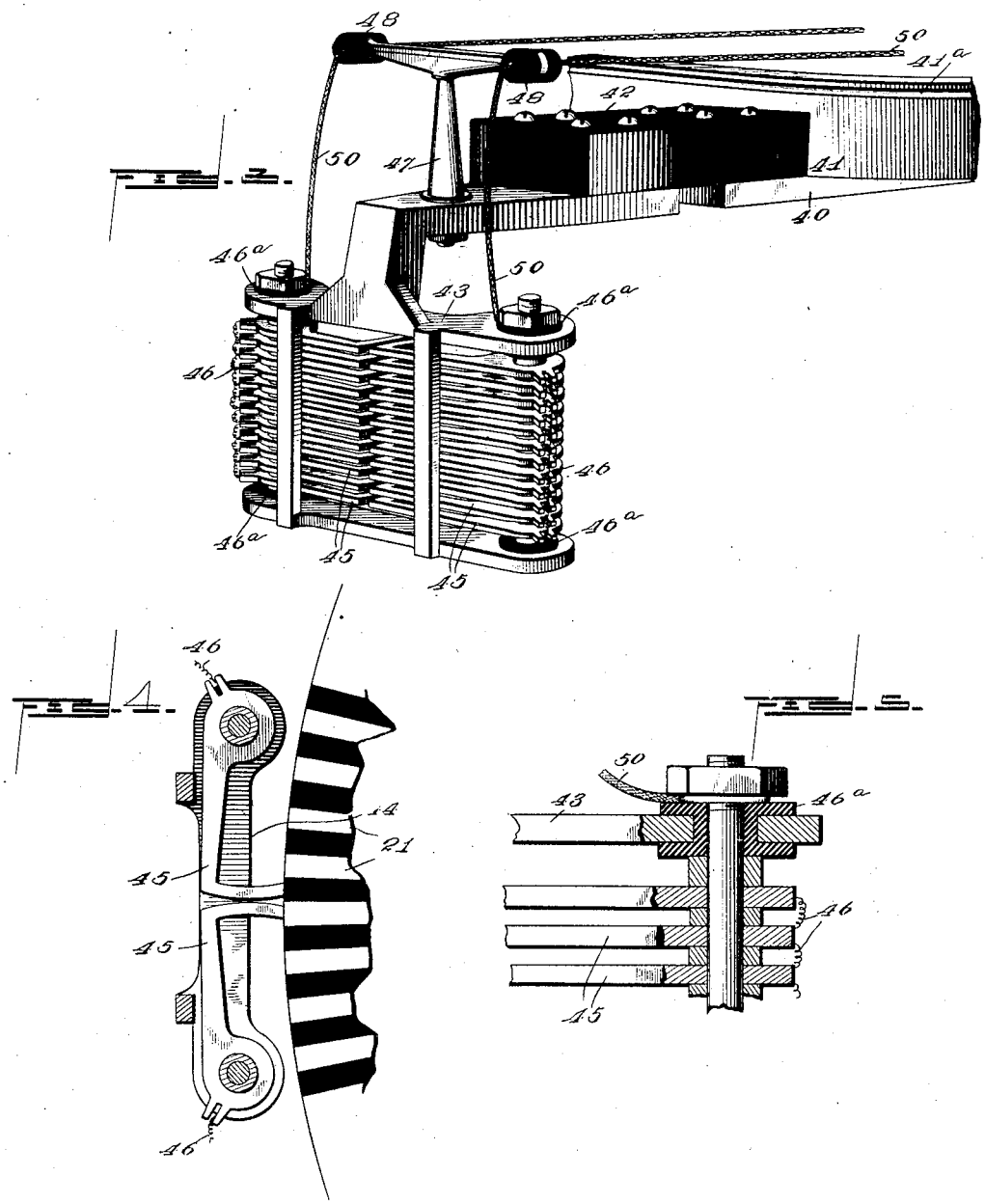
WITNESSES:
INVENTOR
Edward L. Haney
BY
ATTORNEYS No. 785,487. PATENTED MAR. 21, 1905.
E. L. HANEY.
REGULATOR FOR ALTERNATING CURRENTS.
APPLICATION FILED SEPT. 3, 1904.
6 SHEETS—SHEET 4.
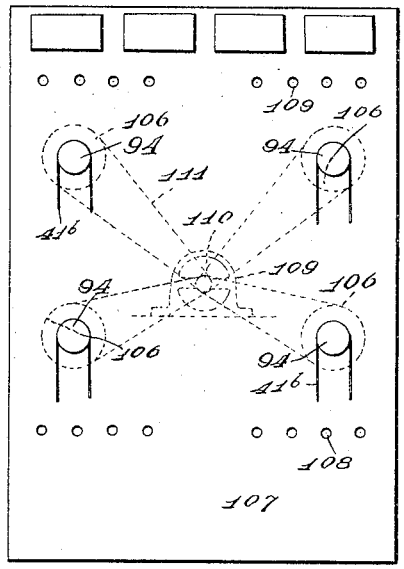
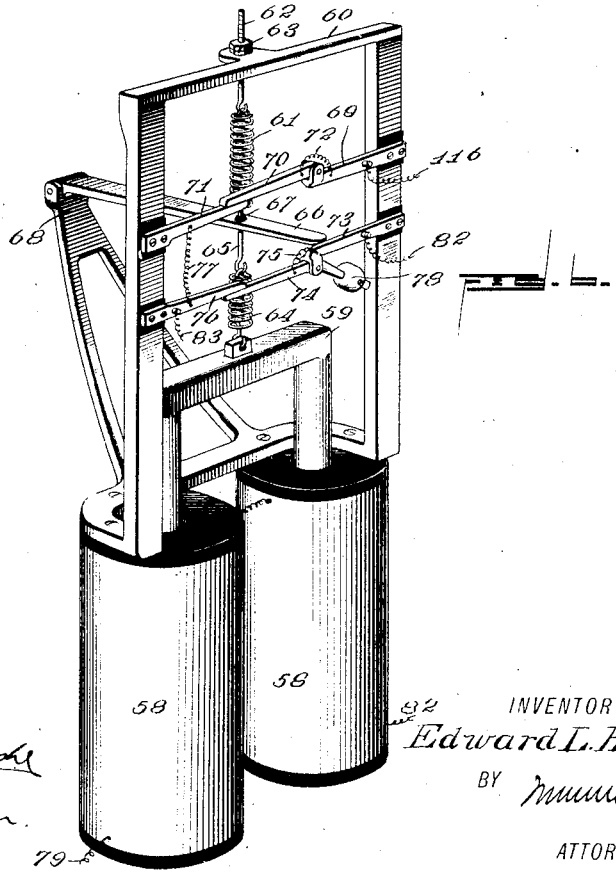
WITNESSES:
INVENTOR
Edward L. Haney
BY
ATTORNEYS.

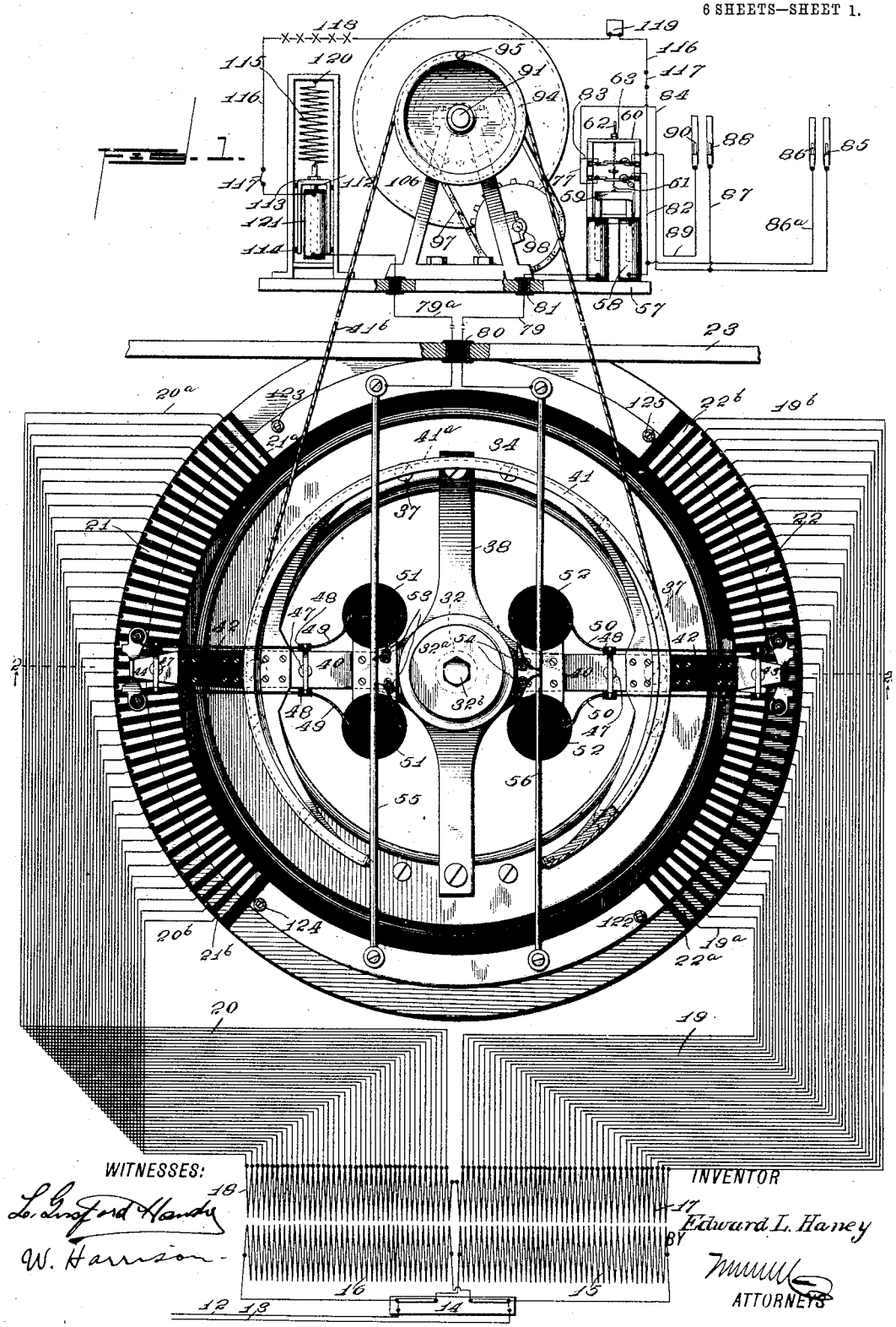

No. 785,487. PATENTED MAR. 21, 1905.
E. L. HANEY.
REGULATOR FOR ALTERNATING CURRENTS.
APPLICATION FILED SEPT. 3, 1904.
6 SHEETS—SHEET 5.
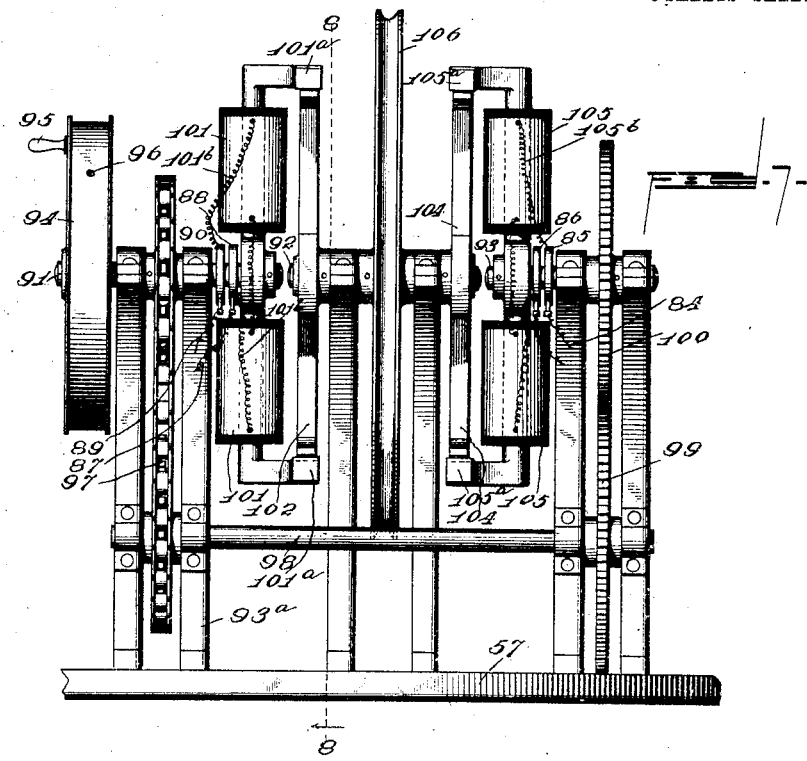
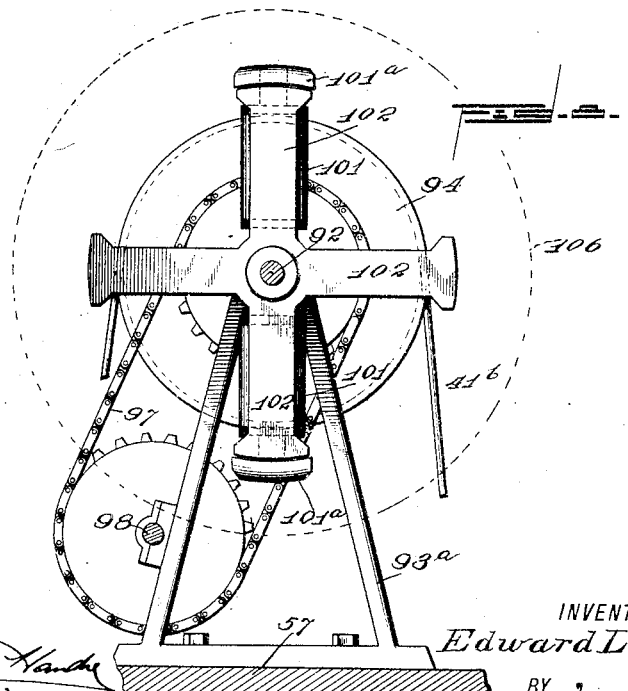
WITNESSES:
INVENTOR
Edward L. Haney
BY
ATTORNEYS

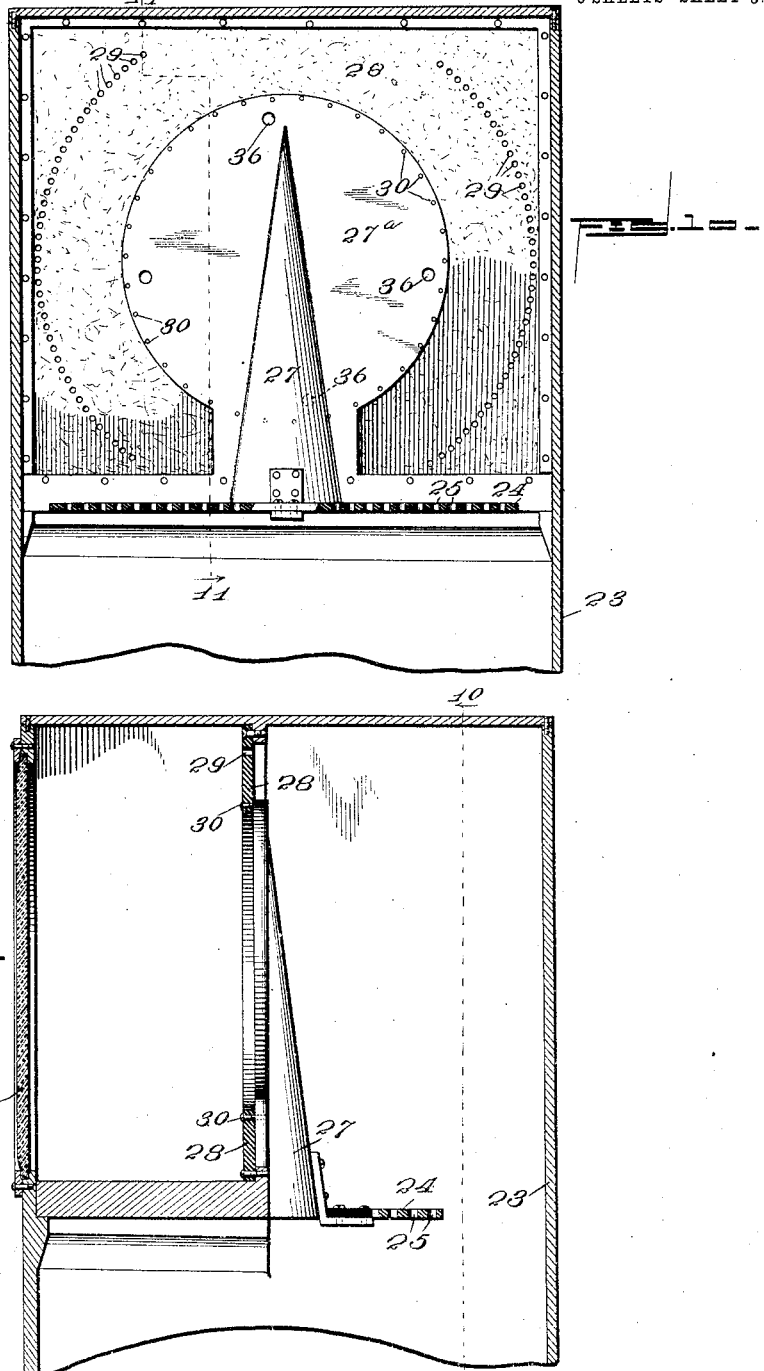

No. 785,487.

Patented March 21, 1905.

UNITED STATES PATENT OFFICE.

EDWARD L. HANEY, OF NASHVILLE, TENNESSEE.

REGULATOR FOR ALTERNATING CURRENTS.

SPECIFICATION forming part of Letters Patent No. 785,487, dated March 21, 1905.

Application filed September 3, 1904. Serial No. 223,258.

*To all whom it may concern:*

Be it known that I, EDWARD L. HANEY, a citizen of the United States, and a resident of Nashville, in the county of Davidson and State of Tennessee, have invented a new and Improved Regulator for Alternating Currents, of which the following is a full, clear, and exact description.

My invention relates to regulators for alternating currents; and it consists, essentially, of a transformer of special construction, together with means for automatically adjusting the same to suit variations in the current.

My invention further consists in certain parts and combinations thereof subordinate to the general object shown in the accompanying drawings and pointed out in the claims.

Reference is to be had to the accompanying drawings, forming a part of this specification, in which similar characters of reference indicate corresponding parts in all the views.

Figure 1 is a front elevation, partly diagrammatic, showing the transformer mechanism and the means for controlling the same. Fig. 2 is a horizontal section through the transformer mechanism and is taken upon the line 2 2 of Fig. 1 looking in the direction of the arrow. Fig. 3 is a fragmentary perspective of one of the brush-holders and its brushes, constituting a part of the commutator. Fig. 4 is a horizontal section through one of the brush-holders, showing the brushes in contact with the sectors. Fig. 5 is a fragmentary plan, partly broken away, showing the manner of mounting the brushes upon the brush-holders. Fig. 6 is a perspective of the cut-out mechanism for shifting the current so as to control the direction of movement of the brushes on the commutator. Fig. 7 is a side elevation of the magnetic clutch mechanism controllable by the cut-out mechanism shown in Fig. 6 for the purpose of reversing the brushes on the commutator. Fig. 8 is a section upon the line 8 8 of Fig. 7, showing the gearing controllable by one of the magnetic clutches for reversing the brushes on the commutator. Fig. 9 is a front elevation of a panel for enabling a number of commutators to be controlled from a central point. Fig. 10 is a vertical central section through the casing within which the transformer and other parts are mounted, and Fig. 11 is a vertical cross-section through the same.

The mains 12 and 13 are supplied with an alternating current from a central station in the usual manner. These mains lead to a distribution-board 14, and the primary windings 15 16 of the transformer are so connected with the mains at this point that the primary windings are energized in parallel with each other or in series, as will be understood from the lower portion of Fig. 1. If for a circuit more than one-half of the full pressure of the transformer, the primary windings should be in parallel; if for less than one-half of the full pressure, the primary windings should be in series. The secondary windings 17 and 18 are connected together serially and are energized by the primary windings 15 16. A number of wires 19, $19^a$, and $19^b$ are connected in parallel with each other and with respect to the secondary winding 17, and a number of wires 20, $20^a$, and $20^b$ are similarly connected with reference to the secondary winding 18. Of the wires connected with the secondary winding 17 the wires $19^a$ and $19^b$ are the extremes of the system connected with the winding 17, the wires $20^a$ and $20^b$ being the extremes of the system connected with the secondary winding 18. The wires 19, $19^a$, $19^b$, 20, $20^a$, and $20^b$ are connected with metallic sectors 21 $21^a$ $21^b$ 22 $22^a$ $22^b$, as will be understood from Fig. 1—that is to say, each wire from the secondary windings 17 and 18 connects with its appropriate sector.

The casing is shown at 23. Mounted within the casing is a board 24, provided with holes 25, through which the secondary wires may be threaded. The casing is provided with a glass face 26 for permitting access to the mechanism and also for observing the condition of the transformer. Upon a brace 27 is riveted a partition 28, of insulating material, provided with holes 29, through which the wires may be threaded and thence distributed to the sectors of the commutator. For this purpose the brace 27 is provided with a web $27^a$, integral therewith, as will be understood from Fig. 10.

Screws 30 serve to connect the partition 28 and the web 27ª together, as will be understood from Fig. 2.

Centrally mounted upon a spider 31 is a pin 32, provided with flanges 33 33ª, and upon the front end of this pin is mounted a washer 32ª, secured in position thereupon by means of a bolt 32ᵇ. This pin is stationary and is encircled by clamping-rings 35 34, which engage the sectors 21, 21ª, 21ᵇ, 22, 22ª, and 22ᵇ. These clamping-rings are secured together by means of bolts 37 and are supported within the casing by means of the comparatively long bolts 36, which pass through the web 27ª, as indicated in Fig. 2. Rigidly mounted upon the clamping-ring 34 is a spider 38, and rigidly mounted upon this spider is a washer 39.

A movable commutator-bar is mounted upon the pin 32 and is engaged by the washer 32ª. Mounted rigidly upon this commutator-bar and movable therewith is an arcuate drum 41 of the form shown more particularly in Fig. 1. Mounted upon the outer ends of the commutator-bar 40 are insulating-blocks 42, supporting brush-holders 43 44, each provided with brushes 45, connected together by a soldered-wire connection 46, for the purpose of securing a good electrical conductivity therebetween. A number of supports 47 are mounted upon the commutator-bar 40 and brush-holders 43 44, these supports being provided with insulating-bushings 48, through which wires 49 and 50 are threaded.

Resistance-coils 51 and 52 are arranged in pairs, as shown, and connected with the commutator-bar 40. These coils are, by means of flexible connections 53 54, in electrical communication with rod 55 56, as indicated in Figs. 1 and 2.

Mounted upon a base 57, Fig. 1, is a solenoid 58, provided with an armature 59, suspended from a frame 60 by means of a spiral spring 61, which is supported by an adjustable hook 62, provided with a nut-lock 63, a spiral spring 64 being connected with the spiral spring 61 by means of a hook 65, as will be seen from Fig. 6. A trigger 66 is connected with the hook 65, which is adjustable thereto by means of nuts 67. The trigger 66 is journaled upon a bearing 68 and is free to move upward or downward, according to the tension upon the springs 61 and 64, due to the position of the armature 59.

Journaled upon a bracket 69, which is insulated from the frame 60, is a lever 70, which engages a contact-bracket 71 and is electrically connected with the bracket 69 by means of a conducting-wire 72. The purpose of this wire is merely to insure good electrical communication between the bracket and the lever. Somewhat similarly a bracket 73 is mounted upon and insulated from the frame 60, and journaled upon this bracket is a lever 74, connected thereto by a conducting-wire 75 and engaging a contact-bracket 76 The lever 70, however, engages the bracket 71 upon the top side thereof, whereas the lever 74 engages the bracket 76 upon its bottom. A conducting-wire 77 connects together the brackets 71 and 76, and a counterweight 78 is connected with the lever 74 for the purpose of normally maintaining the same in engagement with the bracket 76. The lever 70, being depressed by its own weight, is normally in electrical connection with the bracket 71.

From the conducting-rod 56 (see Fig. 1) a wire 79 passes through bushings 80 81, of insulating material, to the solenoid 58. From this solenoid 58 a wire 82 leads upward to the bracket 73, Fig. 6. A wire 83 connects the brackets 71 and 76 (which are indirectly in communication with each other) with a wire 84, which leads to an armature-brush 85, while a wire 86ª connects the wire 82 with an armature-brush 86. From the wire 84 a wire 87 leads upward to an armature-brush 88, while a wire 89 connects the bracket 69 with an armature-brush 90.

Referring to Fig. 7, three revoluble shafts 91, 92, and 93 are journaled upon a suitable framework 93ª, and mounted rigidly upon the shaft 91 and revoluble therewith is a drum 94, provided with a handle 95 and also with a fastening 96 for engaging the cable 41ᵇ, (see Fig. 1,) the cable being preferably wound several times around the drum. The handle 95 may be used for rotating the drum by hand when desired. The drum is free to make a limited number of turns in either direction. By means of a sprocket-gear 97 motion is communicated from the shaft 91 to the shaft 98 and by means of toothed gear-wheels 99 and 100. This shaft in turn may communicate motion to the shaft 93. A pair of magnets 101, provided with cores 101ª, are rigidly connected with the shaft 91 and are revoluble therewith. A revoluble armature 102, having, preferably, the form of a cross, as indicated in Fig. 8, is mounted rigidly upon the shaft 92 and is revoluble therewith. When the magnets 101 are energized by means of wires 101ᵇ, pole-pieces 101ª attract and tend to cling to the armature 102, so that the rotation of the latter tends to turn the magnets 101, and consequently the shaft 91. A pulley 106 is mounted upon the shaft 92 and revoluble therewith, and an armature 104, similar to the armature 102, is mounted upon the shaft 92. Magnets 105 are provided with a pole-piece 105ª and are mounted upon the shaft 93 and revoluble therewith. These magnets are energized by wires 105ᵇ, which are connected with the brushes 85 86 in like manner as the wires 101ᵇ are connected with the brushes 88 90.

Any number of complete mechanisms above described may be grouped together, as indicated in Fig. 9, the several pulleys 94 each being connected by its appropriate cable 41ᵇ, this being provided by means of an appropriate belt 111, with a motor 109, provided with a revoluble member 110 for transmitting motion to the pulleys 106.

The wire 79ª, for instance, Fig. 1, connects the conducting-rod 55 with a solenoid 121, provided with an armature 112, mounted within a yoke 113, this yoke being provided with rollers 114 or other antifriction-bearings, so that it may slide freely within a frame 120. A spiral spring 115 normally supports the armature 112 and the yoke 113, this spiral spring being in turn supported by the frame 120. From the solenoid 121 a wire 116 leads to a plug-switch 117, arc-lamps 118, and an ammeter 119.

A pair of insulated stop-pins 122 123 are provided for limiting the motion of the commutator-bar 40 in one direction, and another pair, 124 125, are provided for the purpose of limiting its play in the opposite direction. The stop-pins 122 123 are spaced a little distance from the adjacent sectors, however, so as to allow the brushes to move entirely over the sectors when the bar is in its extreme position adjacent to these stop-pins, whereas when the bar is in its opposite extreme position, resting against the stop-pins 124 125, its brushes make engagement with the sectors 21ᵇ 22ᵇ. The effect of this arrangement is that when the bar 40 is moved in one direction the voltage is gradually cut down to a minimum, and then the current is stopped altogether, whereas when the commutator-bar is moved in the opposite direction the voltage is gradually increased; but there is no danger of a broken circuit when the pressure is at its maximum. When the commutator-bar 40 is in such position that its further movement is stopped by the pins 122 123, so that the circuit through the commutator is open, the wiring may be safely manipulated by hand.

The operation of my device is as follows: The mains 12 13 being energized, currents are induced in the primary windings 15 16, by which currents are induced in the secondary windings 17 18, so that the sectors 20 20ª 20ᵇ 21 21ª 21ᵇ are energized. Being insulated from each other, however, the currents must pass serially through the entire windings 17 18, except when short-circuited by the commutator. If now the commutator-bar be moved so as to connect together the sectors 21ᵇ 22ᵇ, the current induced in the secondary windings must pass through the entire secondary windings, whereas if the commutator-bar be moved so as to connect together the sectors 21ª 22ª practically all the inductive resistance of the secondary windings is cut out, and the voltage passing through the sectors thus connected is reduced to a minimum. By turning the commutator-bar 40 to any intermediate angle the voltage is governed accordingly. The commutator-bar may be manipulated by turning the handle 95, as above described, or may be adjusted automatically. This motion being communicated to the pulley 106 by any desired agency, the shaft 92, and consequently the armatures 101 and 104, all turn constantly in the same direction. When the magnets 101 or 105 are energized, the armatures 102 or 104 cause the same to turn, thereby producing more or less torque in the shafts 91 93 and causing the drum 94 to rotate, the direction of revolution depending upon which pair of magnets 101 or 105 is energized. Suppose now that the parts are in their normal positions and that current is being supplied from the secondary windings 17 through the commutator mechanism to the lamps. The general course of the current is as follows: secondary windings 17, wires 19, 19ª, or 19ᵇ to brush-holder 43, thence in parallel through wires 50 and resistance-coils 52 to the bar 56, thence to wire 79, to solenoid 58, thence through wire 82, bracket 73, Fig. 6, lever 74, brackets 76 and 71, lever 70, bracket 69, wire 116, ammeter 119, lamps 118, solenoid 121, wire 79ª, rod 55, thence in parallel through flexible connections 53, resistance-coils 51, wire 49, sectors 21, 21ª, 21ᵇ, wires 20, 20ª, 20ᵇ, back to secondary winding 18. This energizes the solenoids 58 and 121. The armature 59 being attracted by the solenoid 58 causes the trigger 66 to assume a central position, as indicated in Fig. 6, and to maintain this position so long as the current is approximately constant. If, however, the current drops down, as frequently happens, for instance, when the arcs of the lamps are too long, so that the resistance of the lamp-circuit is unduly increased, the solenoid 58 is not only able to restrain the trigger 66, which moves upward and raises the lever 70, thereby opening that part of the circuit passing through this lever. The circuit after leaving the solenoid 58, as above described, thereupon takes the following course: wire 82, wire 77, wire 84, brush 88, brush 90, wire 89, to wire 116, whence it proceeds to the lamps, solenoid 121, sectors 20 20ª 20ᵇ, and back to secondary 18, as above described. This circuit through the brushes 88 90 energizes the magnets 101, causing the same to cling to the armature 102, and as the pulley 106 is constantly rotating, as above described, the magnets 101 and armature 102 act as a magnetic clutch, causing the shaft 91 to rotate in the same direction as the rotation of the pulley 106—that is to say, in a contra-clockwise direction, as seen in Fig. 1. The drum 94 thereupon communicates motion by means of the cable 41ᵇ to the arcuate drum 41, moving the same in a contra-clockwise direction and turning the commutator-bar 41 upon its center, so that its left-hand end approaches the sector 21ᵇ. This movement of the commutator-bar increases the voltage, as above described, and restores the lamp-circuit to its normal condition. The greater the undesirable drop of the voltage in the lamp-circuit at any time the further is the movement of the commutator-bar 40 and the greater the tendency of the apparatus to correct the current. If now, on the other hand, the current becomes excessive, the armature 59 is drawn downward a considerable distance, so as to lower the lever 74, thus breaking communication between this lever and the bracket 76. The current from the wire 79 after passing through the solenoid 58 now passes through wire 82, brushes 86 85, wire 84, bracket 71, lever 70, bracket 69, wire 116, ammeter 19, thence through the lamps, solenoid 121, left-hand sectors of the commutator, back to the secondary winding 18. This circuit through the brushes 85 86 energizes the magnets 105, causing the pole-pieces 105ª to cling to and follow the armature 104, thereby causing the magnets 105 and the shaft 93 to rotate in the same direction as the pulley 106. The shaft 93 thereupon communicates a reverse motion to the shaft 98 by acting thereupon through the medium of the gears 100 99 and causes the sprocket-gearing 97 to cause the rotation of the drum 94 in a direction opposite to that above described, so that the commutator-bar 40 is moved in the contrary direction, so as to decrease the current to an appropriate degree. In either case, whether the current be too high or too low, as soon as the same is corrected the trigger 66 assumes its central position and the levers 70 74 close upon their respective brackets 71 76. The apparatus is thus self-regulating.

As indicated in Fig. 9, any number of the transformer mechanisms may be grouped together, the several pulleys 106 being driven from a common central source, such as a motor 110. To briefly summarize, therefore, the apparatus may be considered as a transformer provided with sectors, a commutator adapted to move over the sectors and provided with brushes for engaging the same, and thus changing the voltage, a pair of magnetic clutches, each having a member connected with a revoluble pulley and energized independently of each other, so that the motion from the pulley is caused to move the commutator-bar in either direction, so as to increase or diminish the voltage.

Owing to the fact that the contact between the brushes and the sectors is somewhat imperfect and that a brush in moving from one sector to another tends to vary the voltage, because of resting partly upon one sector and partly upon another, and owing to the fact that one brush may be upon another sector, and owing to the further fact that the current may be divided between brushes resting on different sectors, there will of course be variations in the current, due to the movements of the commutator-bar 40. The solenoid 121, however, serves as an inductance-coil, and its movable armature 112 serves to vary the inductance of the current passing through the solenoid. The action of this part of the apparatus is substantially that of a choking-coil, and the effect of the variations, due to the movements of the brushes, is therefore rendered less pronounced and less objectionable. In other words, the solenoid 121 and its movable core, considered as an inductance device, take care of the variations due to the contact of the brushes upon the sectors.

The casing of the transformer, including the part containing the commutator, is filled with oil. The presence of the oil prevents abruptness of movement in the commutator-bar, the principle being analogous to that of a dash-pot. The oil also prevents the current from hitting or otherwise injuring the sectors when making and breaking contact.

Having thus described my invention, I claim as new and desire to secure by Letters Patent—

1. In a regulator for alternating currents, the combination of a transformer provided with primary and secondary windings, a commutator connected with the secondary winding and provided with a movable member for changing the voltage supplied by said secondary winding, a plurality of clutches provided with movable members, gearing connecting said members together so that the movements of one control the movements of another, mechanism connecting said clutch members with said revoluble member, and a pulley for conferring a revoluble movement upon one or the other of said clutch members.

2. In a regulator for alternating currents, the combination of a revoluble member driven continuously in a single direction and provided with armatures, revoluble magnetic members geared together and provided with pole-pieces for attracting said armatures, means controllable by the current of the main circuit for energizing said magnetic members, a commutator provided with a movable member, to be actuated by the movements of said members, and a transformer having a plurality of windings, one of which acts inductively upon another and one of said windings being connected with said commutator.

3. In a regulator for alternating currents, the combination of a commutator member provided with sectors, a commutator-bar provided with brushes for engaging said sectors, a transformer connected with said commutator member, and an inductance-coil provided with a movable core and connected with the circuit through said sectors and said commutator-bar for the purpose of alleviating variations in the current due to change in the position of said commutator-bar relatively to said sectors.

4. In a regulator for alternating currents, the combination of a magnetic member provided with a movable core, a plurality of contact-levers, a trigger connected with said core and adapted to open the one or the other of said levers, according to the direction of movement of said core, magnetic clutch mechanism electrically connected with said contact-levers and energized thereby, a pulley adapted to move continuously and to rotate said clutch mechanism in the one direction or in the other, according to the direction of movement of said trigger, a commutator, connections extending therefrom to said clutch members, and a transformer connected with said commutator.

5. In a regulator for alternating currents, the combination of a transformer provided with primary and secondary windings, a commutator provided with a movable member for varying the voltage supplied by the secondary winding, gearing for actuating said member, a reversible clutch connected with said gearing for actuating the same, a pulley adapted to move continuously in the common direction for the purpose of causing the said gearing to actuate said member of said commutator, an electric mechanism controllable automatically by the current of the main circuit, for reversing said clutch.

6. The combination of a transformer provided with a secondary winding and with a movable member for changing the voltage of said secondary winding, mechanism for actuating said movable member, and electrically-operated mechanism connected with said transformer and controllable by currents therefrom for connecting said first-named mechanism with said movable member and for disconnecting the same therefrom.

7. The combination of a transformer provided with a primary winding and with a secondary winding, a commutator connected with said secondary winding and provided with a movable member for changing the voltage supplied by said secondary winding, mechanism for actuating said movable member, and a magnetic clutch controllable automatically by the electric current for connecting said mechanism and said movable member together.

8. The combination of a transformer provided with sectors, a movable arm provided with brushes for engaging said sectors, mechanism provided with a movable member for actuating said arm mechanically, and electrically-operated mechanism connected with said transformer and controllable electrically thereby for automatically connecting said movable member with said arm and disconnecting the same therefrom.

9. The combination of a pair of clamping-rings, means for forcing the same toward each other, a plurality of sectors of conducting material mounted between said rings and insulated therefrom, a transformer provided with primary and secondary windings, said secondary winding being connected with said sectors, a movable arm provided with brushes engaging said sectors, and electrically-operated mechanism connected with said transformer and controllable by currents therefrom for moving said arm.

10. The combination of a casing, an annular partition of insulating material mounted therein, a plurality of commutator-segments connected together and formed into substantially arc-shaped members mounted upon said partition, a revoluble arm pivoted at a point concentric with said annular partition and provided with brushes movable angularly in relation to said commutator-segments, a transformer provided with a primary and a secondary winding, said secondary winding being connected with said sectors, means for actuating said revoluable arm, and electrically-operated mechanism connected with said transformer and controllable by currents therefrom for connecting said last-mentioned means with said arm and for disconnecting the same therefrom.

In testimony whereof I have signed my name to this specification in the presence of two subscribing witnesses.

EDWARD L. HANEY.

Witnesses:
　EMORY W. MORRISON,
　BURGESS H. SMITH.